(12) United States Patent
Wintzell (10) Patent No.: US 8,018,902 B2
(45) Date of Patent: Sep. 13, 2011

(54) METHODS AND APPARATUS FOR CHANNEL QUALITY INDICATOR DETERMINATION

(75) Inventor: Ola Wintzell, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1860 days.

(21) Appl. No.: 10/455,351

(22) Filed: Jun. 6, 2003

(65) Prior Publication Data

US 2005/0003782 A1   Jan. 6, 2005

(51) Int. Cl.
*H04W 4/00* (2009.01)
*H04B 17/02* (2006.01)
*H03M 13/00* (2006.01)

(52) U.S. Cl. ............ 370/332; 455/135; 455/277.2; 714/752; 714/780

(58) Field of Classification Search .......... 370/277
See application file for complete search history.

(56) References Cited

U.S. PATENT DOCUMENTS

| | | | | |
|---|---|---|---|---|
| 4,261,054 | A * | 4/1981 | Scharla-Nielsen | 455/13.4 |
| 6,347,124 | B1 * | 2/2002 | Antia et al. | 375/341 |
| 6,415,137 | B1 * | 7/2002 | Hayashi | 455/70 |
| 6,516,443 | B1 * | 2/2003 | Zook | 714/792 |
| 6,606,726 | B1 * | 8/2003 | Wilhelmsson et al. | 714/758 |
| 6,625,778 | B1 * | 9/2003 | Nakamura et al. | 714/786 |
| 6,771,978 | B1 * | 8/2004 | Kayama et al. | 455/522 |
| 6,868,277 | B1 * | 3/2005 | Cerwall et al. | 455/509 |
| 2001/0020287 | A1 * | 9/2001 | Yano et al. | 714/780 |
| 2001/0028690 | A1 * | 10/2001 | Ebel, Sr. | 375/340 |
| 2002/0064135 | A1 | 5/2002 | Chen et al. | |
| 2003/0014712 | A1 * | 1/2003 | Yano et al. | 714/786 |
| 2003/0035403 | A1 | 2/2003 | Choi et al. | |
| 2003/0043764 | A1 * | 3/2003 | Kim et al. | 370/329 |
| 2003/0072395 | A1 * | 4/2003 | Jia et al. | 375/341 |
| 2003/0074476 | A1 * | 4/2003 | Kim et al. | 709/246 |
| 2003/0081692 | A1 * | 5/2003 | Kwan et al. | 375/295 |
| 2003/0103585 | A1 * | 6/2003 | Kim et al. | 375/340 |
| 2003/0123409 | A1 * | 7/2003 | Kwak et al. | 370/335 |
| 2003/0156573 | A1 * | 8/2003 | Tran et al. | 370/349 |
| 2003/0161285 | A1 * | 8/2003 | Tiedemann et al. | 370/332 |
| 2004/0001472 | A1 * | 1/2004 | Kwak et al. | 370/342 |

(Continued)

FOREIGN PATENT DOCUMENTS

EP   0928074 A2   7/1999

(Continued)

OTHER PUBLICATIONS

Das et al., "Design and Performance of Down Link Shared Control Channel for HSDPA," 0-7803-7589-0/02, IEEE (2002).

(Continued)

*Primary Examiner* — Chirag Shah
*Assistant Examiner* — Suk Jin Kang
(74) *Attorney, Agent, or Firm* — Potomac Patent Group PLLC (57) ABSTRACT

A channel quality indicator value is determined on a per transport block basis. A signal-to-interference ratio estimate of a control channel and a channel quality estimate of user-data channel are employed in the determination of the channel quality indicator. The channel quality estimate of the user-data channel can include information about Automatic Retransmission Request (ARQ) processing, and the number of iterations of a Turbo decoder. Additionally, information about the Cyclic Redundancy Check (CRC), which is determined on a per transport block basis, can be employed in the channel quality indicator determination. The determined channel quality indicator is reported to the radio communication system.

20 Claims, 3 Drawing Sheets

U.S. PATENT DOCUMENTS

| | | | |
|---|---|---|---|
| 2004/0010743 A1* | 1/2004 | Lee et al. | 714/748 |
| 2004/0013172 A1* | 1/2004 | Hashiguchi et al. | 375/148 |
| 2004/0018843 A1* | 1/2004 | Cerwall et al. | 455/450 |
| 2004/0062192 A1* | 4/2004 | Liu et al. | 370/208 |
| 2004/0110473 A1* | 6/2004 | Rudolf et al. | 455/69 |
| 2004/0136313 A1* | 7/2004 | Goldstein et al. | 370/203 |
| 2004/0142698 A1* | 7/2004 | Pietraski | 455/452.2 |
| 2004/0146023 A1* | 7/2004 | Pietraski et al. | 370/333 |
| 2004/0168114 A1* | 8/2004 | Richardson et al. | 714/758 |
| 2004/0237019 A1* | 11/2004 | Lin | 714/755 |
| 2005/0239467 A1* | 10/2005 | Nishio | 455/442 |
| 2007/0026803 A1* | 2/2007 | Malm | 455/63.1 |

FOREIGN PATENT DOCUMENTS

| | | |
|---|---|---|
| EP | 0982874 A2 | 3/2000 |
| EP | 1067706 A1 | 1/2001 |
| EP | 1176750 A1 | 1/2002 |
| EP | 1 248 485 A1 | 10/2002 |
| WO | WO 03/001681 A2 | 1/2003 |

OTHER PUBLICATIONS

"*Digital Baseband Architecture Scenarios for a Multi-Mode Radio*," UniS, IST-2001-34561, pp. 1-94 (2002).

*3rd Generation Partnership Project; Technical Specification Group Radio Access Nework Physical Layer Procedures (FDD)* (Release 5), 3GPP TS 25.214, V5.3.0 (Dec. 2002), pp. 3-63.

Zhang et al., *Turbo Coded HSDPA Systems with Transmit Diversity Over Frequency*, pp. 90-94, 0-7803-7589-0/02, IEEE (2002).

Written Opinion dated Jul. 20, 2004 in connection with counterpart Application PCT/EP 2004/005703.

\* cited by examiner

| Signal-to-Interference Ratio | Channel Quality Indicator |
|---|---|
| $SIR_0$ | $CQI_0$ |
| $SIR_1$ | $CQI_1$ |
| $SIR_2$ | $CQI_2$ |
| $SIR_3$ | $CQI_3$ |
| $SIR_4$ | $CQI_4$ |
| $SIR_n$ | $CQI_n$ |

Figure 3A

| SIR | HARQ Info | Turbo Decoder Info | CQI |
|---|---|---|---|
| $SIR_0$ | $HARQ_0$ | $TD_0$ | $CQI_0$ |
| | | $TD_1$ | $CQI_1$ |
| | | $TD_2$ | $CQI_2$ |
| | | . | . |
| | | $TD_p$ | $CQI_{p-1}$ |
| | $HARQ_1$ | $TD_0$ | $CQI_p$ |
| | | $TD_1$ | $CQI_{p+1}$ |
| | | $TD_2$ | $CQI_{p+2}$ |
| | | . | . |
| | | $TD_p$ | $CQI_{2p-1}$ |
| | . | | |
| | $HARQ_m$ | $TD_0$ | $CQI_{mp}$ |
| | | $TD_1$ | $CQI_{mp+1}$ |
| | | $TD_2$ | $CQI_{mp+2}$ |
| | | . | . |
| | | $TD_p$ | $CQI_{(m+1)p-1}$ |
| $SIR_1$ | $HARQ_0$ | $TD_0$ | $CQI_{(m+1)p}$ |
| | | $TD_1$ | $CQI_{(m+1)p+1}$ |
| | | $TD_2$ | $CQI_{(m+1)p+2}$ |
| | | . | . |
| | | $TD_p$ | $CQI_{(m+2)p-1}$ |
| | $HARQ_1$ | $TD_0$ | $CQI_{(m+2)p}$ |
| | | $TD_1$ | $CQI_{(m+2)p+1}$ |
| | | $TD_2$ | $CQI_{(m+2)p+2}$ |
| | | . | . |
| | | $TD_p$ | $CQI_{(m+3)p}$ |
| | . | | |
| | $HARQ_m$ | $TD_0$ | $CQI_{(2m+1)p}$ |
| | | $TD_1$ | $CQI_{(2m+1)p+1}$ |
| | | $TD_2$ | $CQI_{(2m+1)p+2}$ |
| | | . | . |
| | | $TD_p$ | $CQI_{(2m+2)p-1}$ |
| $SIR_2$ | $HARQ_0$ | $TD_0$ | $CQI_{(2m+2)p}$ |
| | | $TD_1$ | $CQI_{(2m+2)p+1}$ |
| | | $TD_2$ | $CQI_{(2m+2)p+2}$ |
| | | . | . |
| | | $TD_p$ | $CQI_{(2m+3)p-1}$ |
| | $HARQ_1$ | $TD_0$ | $CQI_{(2m+3)p}$ |
| | | $TD_1$ | $CQI_{(2m+3)p+1}$ |
| | | $TD_2$ | $CQI_{(2m+3)p+2}$ |
| | | . | . |
| | | $TD_p$ | $CQI_{(2m+4)p-1}$ |

Figure 3B

METHODS AND APPARATUS FOR CHANNEL QUALITY INDICATOR DETERMINATION

BACKGROUND

The invention relates to the determination of channel quality in communication systems, and more particularly to a determination of a channel quality indicator in a radio communications network.

As the popularity of communication in radio communications networks continues to grow, there has been increased interest in providing packet data communications in radio communications networks. High-Speed Downlink Packet Access (HSDPA) is a service which is currently being developed for providing packet data communications in radio communications networks.

Due to the differences between voice communications and packet data communications, the design of these systems can be quite different. For example, since voice communications in radio communications networks are treated as a single stream of information, a single channel is typically reserved for each voice communication. In contrast, packet data communications can be discontinuous, and hence, many packet data communications can share access to a single channel.

Accordingly, the HSDPA service provides for adaptive modulation in the downlink, i.e., the channel from the communication network to a radio receiver. Specifically, the transport format, (i.e., the channel coding and modulation), that is to be used for transmission by the radio communications network is determined for each transmitted packet. The choice of transport format selected by the radio communications network is based upon a Channel Quality Indicator (CQI) value reported by a radio receiver. The transport format may also be based on the received power control commands or on other information that can be estimated by the base station, e.g., power and quality of the data symbols on the uplink.

The determination of the CQI is based on two components. The first component is likely to be based on a signal-to-interference ratio (SIR) measurement of a pilot channel. The second component of the CQI determination requires that the determined CQI result in a transport block error probability which is approximately 10 percent, without exceeding 10 percent. Therefore, it would be desirable to provide methods and apparatus for determining a particular CQI value which will result in a transport block error probability which is approximately 10 percent, without exceeding 10 percent.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, a channel quality indicator is determined on a per transport block basis. Specifically, a channel quality value of a pilot channel and a channel quality value of a user-data channel are employed in the determination of the channel quality indicator. The channel quality value of the user-data channel can be determined based on Hybrid Automatic Retransmission (HARQ) processing and/or Turbo decoder processing. The channel quality value of the user-data channel can also be determined based on Cyclic Redundancy Check (CRC) processing, or based on a combination of HARQ, Turbo decoder and CRC processing.

In accordance with another aspect of the present invention, the channel quality indicator is determined. A first channel quality value is based on a channel quality of a pilot channel, a second channel quality value is based on a channel quality of a user-data channel, and a third channel quality value is determined based on a transport block integrity check. The first and second channel quality values are employed in the determination of the channel quality indicator. The third channel quality value can also be employed in the determination of the channel quality indicator.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Figure 1A:
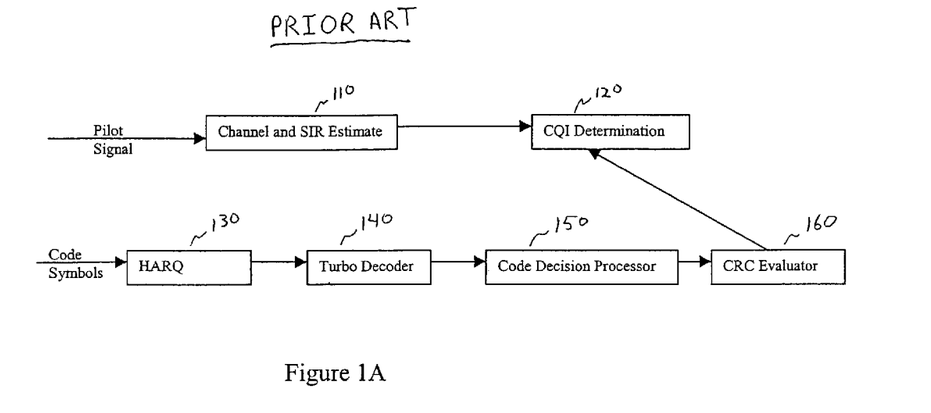
FIG. 1A is a block diagram of a conventional receiver.

FIG. 1A is a block diagram of a conventional receiver. As illustrated in FIG. 1A the receiver receives and processes a pilot signal and code symbols. The pilot signal is received on a first channel, for example, a control channel. The code symbols are transmitted in user-data packets, which are referred to in the art as transport blocks. Processing block 110 uses the pilot signal to perform a channel and SIR estimation.

The channel and SIR estimates are provided to CQI determination block 120 for use as the first component employed in the CQI determination.

Systems which employ the HSDPA service provide for a Hybrid Automatic Retransmission Request (HARQ) scheme. If a transport block is not able to be decoded by the receiver, the transport block will be retransmitted, possibly with additional redundancy. The retransmitted transport block is soft-combined in the receiver, e.g., in the HARQ processing block 130, with the previously failed version of the transport block. Accordingly, the code symbols are received on a second channel, i.e., the High Speed Downlink Shared Channel (HS-DSCH) and processed by HARQ processing block 130. The HARQ processing block provides the received transport block to a decoder 140, for example a Turbo decoder.

Turbo decoders in receivers operate in response to a Turbo encoder at the transmitter to produce error resistant communications. Specifically, a Turbo decoder typically will include a first and second decoder. The first decoder operates on a code symbol of a transport block to produce extrinsic information as well as an output vector L1. In the terminology of Turbo decoders, this procedure is called one half iteration. The extrinsic information is in the form of soft values, or estimates of the original transmitted data symbols, whereas the output vector L1 is a hard value (i.e., the decided upon values that are considered to represent the original transmitted data symbols).

In the Turbo decoder arrangement, the extrinsic information generated by the first decoder as a result of its half iteration is shuffled by an interleaver, and the shuffled information is then supplied to the second decoder. The second decoder is then permitted to operate. The extrinsic information supplied by the first decoder via the interleaver is taken into account together with the received signal when the second decoder performs its half iteration, which in turn produces extrinsic information as well as an output vector that, after un-shuffling by the deinterleaver, is an output vector $L^i{}_2$. Since the second decoder operates on interleaved data, its output extrinsic information is also interleaved. Thus, the extrinsic information generated by the second decoder is supplied to a deinterleaver so that it may be passed on to the first interleaver for use in a next half iteration.

One full run of the first decoder followed by a full run of the second decoder constitutes one Turbo decoder iteration. The output of the classic Turbo decoder is supplied only by the output vector $L^i{}_2$, so two "independently" decoded soft value vectors are only available once per iteration. In operation, some number of Turbo decoder iterations are performed until the output vector $L^i{}_2$ is considered to have converged on a reliable result.

Referring again to FIG. 1A, soft values arrived at by the Turbo decoder, as a result of the convergence of values on a reliable result, are provided to code decision processor 150 which uses the soft values to recover the transmitted code symbols of a particular transport block. The recovered code symbols are then provided to a Cyclic Redundancy Check (CRC) evaluator 160. The CRC evaluator 160 accumulates a number of code symbols until an entire transport block has been received. At the transmitter a CRC is associated with a transport block, and as is well known in the art is calculated based upon the contents of the transport block. Accordingly, the CRC evaluator 160 determines whether the transport block, as recovered by receiver, has been correctly received by performing an evaluation using the recovered CRC. If the CRC evaluator 160 determines that the transport block recovered by the receiver is not correct based upon the CRC calculation, then it is determined that there was an error in the decoding of the transport block.

As illustrated in FIG. 1A, the CRC evaluator 160 can provide an indication of the number of transport block errors to the CQI determination processing block 120, for determining the second component of the CQI determination, i.e., the BLER.

Although the CRC evaluation provides a direct measure of transport block errors, it would require the accumulation of CRCs from 10-100 transport blocks transmitted based on a particular CQI before a determination can be made that the transport block error probability is approximately 10 percent, without exceeding 10 percent. Since the packet data in HSPDA service can be discontinuous, accumulating CRCs from a large number of code blocks by a particular radio receiver may not provide an accurate characterization of the current channel quality. Moreover, even providing an indication of a transport block error itself may not be enough information to evaluate the second component of the CQI evaluation.

Figure 1B:
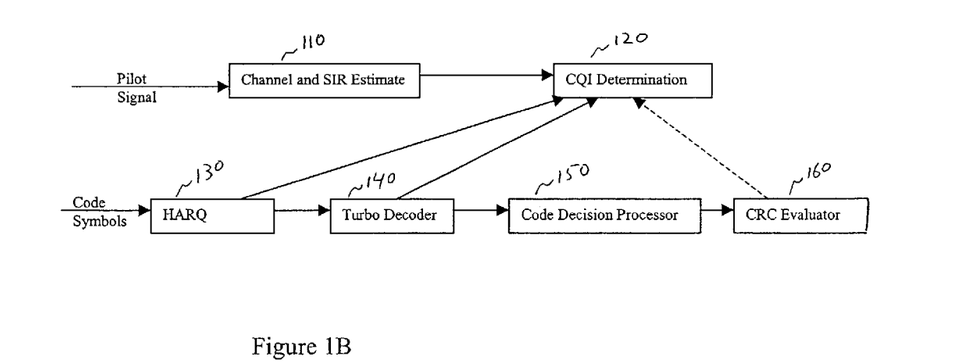
FIG. 1B is a block diagram of a receiver in accordance with one embodiment of the present invention.

FIG. 1B illustrates a radio receiver in accordance with one embodiment of the present invention. In accordance with this embodiment of the present invention the second component of the CQI evaluation is performed on a per transport block basis, thereby providing a fast indicator of the quality of the channel to supplement the SIR estimation. Accordingly, as illustrated in FIG. 1B, information from HARQ processing block 130 and Turbo decoder 140 can provide information on a per transport block basis for use in the CQI determination processing block 120. Additionally, information from CRC evaluator 160 can be employed in the CQI determination processing block 120.

The HARQ processing block 130 can provide an indication to the CQI determination processing block 120 of whether the particular transport block being decoded is an originally transmitted transport block, or is a retransmitted transport block. If the particular transport block is a retransmitted transport block, the HARQ processing block can indicate how many times the original transport block has been retransmitted when the particular transport block is being decoded, which is referred to in the art as the redundancy version of the processing block. The greater the number of retransmissions required to decode a particular transport block is an indication of a lower channel quality. Conversely, if a particular transport block is decoded without retransmissions the channel quality is determined to be acceptable or too high.

The Turbo decoder processing block 140 can provide an indication of the number iterations employed in decoding a particular code block. For a Turbo decoder which stops iterating when a steady state solution is achieved that does not change the output bits over consecutive iterations of the Turbo decoder, the greater the number of iterations of the Turbo decoder indicates a lower channel quality. Conversely, the lower the number of iterations of the Turbo decoder the greater the channel quality. Additionally, the soft values obtained during the Turbo decoding can be employed in the CQI determination. For example, a flat distribution of soft values indicates a poor channel quality. In addition, an average distance between the actual soft values and the ideal soft values for a noiseless channel can be calculated. A small average distance is an indication of good channel quality.

Although a Turbo decoder with a specific type of stop condition has been described, the present invention is equally applicable to any type of iterative decoder where the number of iterations of the iterative decoder are directly or indirectly indicative of the quality of a channel. Accordingly, how the CQI determination processing block 120 interprets the number of iterations provided by the iterative decoder will depend on the type of iterative decoder which is employed. One of ordinary skill in the art with an understanding of the operation of a particular iterative decoder could determine how to adjust the CQI determination processing based upon the operation of the particular iterative decoder.

The specific way in which the information from the HARQ processing block 130 and the Turbo decoder 140 are employed for determining whether a particular CQI will result in a transport block error probability of approximately 10 percent, without exceeding 10 percent, will depend upon the particular Turbo decoder employed. However, using well-known tools, e.g., computer simulations, empirical data can be collected for transport blocks encoded based on different CQI values for varying radio conditions based on, for example SIR values, and the number of retransmissions and iterations of Turbo decoding required to decode the code blocks based on the different CQI values for varying radio conditions. Using the empirical data a relationship between the number of retransmissions and iterations of Turbo decoding and the transport block error probability can be determined. The determined relationship is then employed for determining whether a transport format associated with a particular CQI value, based on a number of retransmissions and iterations of the Turbo decoder, will result in a transport block error probability of approximately 10 percent, but is not greater than 10 percent.

The CQI determination processing block 120 processes the information received from the HARQ processing block 130, Turbo decoder processing block 140, and if available, information from CRC evaluator 160 to determine the second component of the CQI determination.

Figure 2:
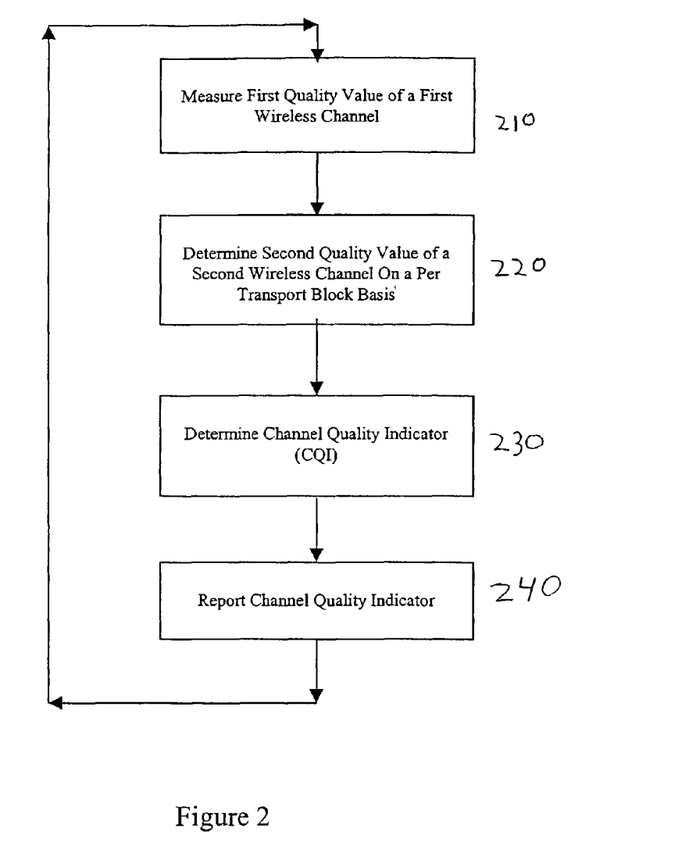
FIG. 2 is a flow diagram of the Channel Quality Indicator (CQI) determination in accordance with the present invention.

FIG. 2 illustrates an exemplary method for determining a channel quality indicator in accordance with the present invention. Initially, the radio receiver measures a first quality value, e.g., the SIR, of a first wireless channel, e.g., the pilot channel (step 210). The radio receiver also determines a second quality value of a second wireless channel, e.g., the HS-DSCH, on a per transport block basis (step 220). The radio receiver then determines a CQI value based on the first and second quality values (step 230). The determined CQI value is reported to the radio communications network (step 240). Although the determination of the first and second quality values are illustrated in the method of FIG. 2 as being performed sequentially, these steps can be performed in parallel.

Figure 3A:
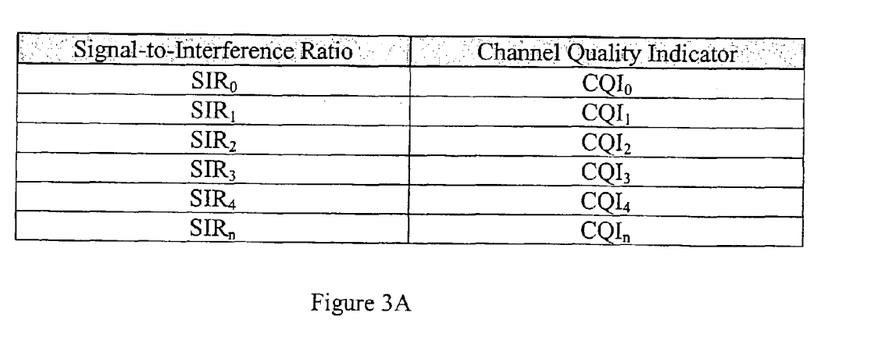
FIG. 3A is an exemplary table used in the CQI determination in accordance with an embodiment of the present invention.
Figure 3B:
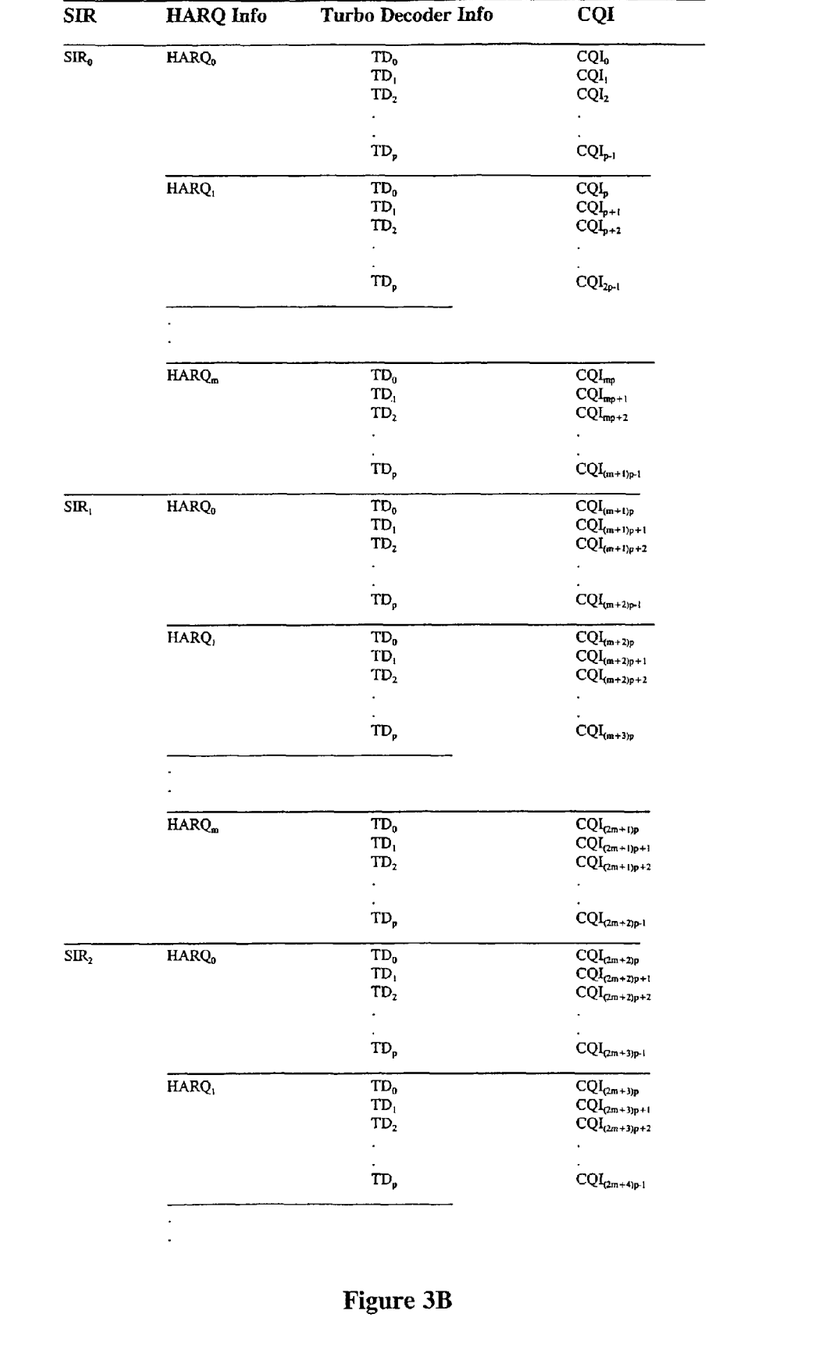
FIG. 3B is a portion of an exemplary table used in the CQI determination in accordance with another embodiment of the present invention.

In accordance with exemplary embodiments of the present invention the CQI value is determined by employing a look-up table in a memory of the radio receiver. FIGS. 3A and 3B respectively illustrate exemplary look-up tables in accordance with embodiments of the present invention. In accordance with one embodiment of the present invention, as illustrated in FIG. 3A, a look-up table stored in the radio receiver contains a mapping between the SIR and a CQI value. Since a pilot channel is typically at a higher power than a data channel an offset should be applied to the pilot SIR value to account for this power difference. This offset can vary over time depending on the number of users involved and on the type of services they demand. Accordingly, an SIR value determined using the pilot signal, and adjusted by the offset, is used to determine a CQI value. This CQI value is then modified based upon the additional information provided by the second component of the CQI determination, i.e., the HARQ, Turbo decoding, and if available the CRC information. Alternatively, the offset to the pilot SIR value can be applied when the determined CQI value is modified based on the additional information.

For example, if it is determined that the SIR adjusted for the offset is $SIR_2$, which corresponds to a value of $CQI_2$, and that the currently received transport block was a retransmission and required a large number of iterations of the Turbo decoder, the CQI value of $CQI_2$ could be modified to provide a CQI value which indicates a lesser quality of the channel than $CQI_2$. Specifically, based upon the empirical data, the radio receiver uses the number of retransmissions and iterations of the Turbo decoder to determine how to adjust the CQI value determined using the SIR. This CQI value would be employed by the radio communications network to select a modulation and coding scheme which meets the requirements of a transport block error probability of approximately 10 percent, but not greater than 10 percent.

Alternatively, the determination of the SIR value used in connection with the look-up table can be made to account for the information from the second component of the CQI evaluation. In this embodiment an initial SIR value is determined using the pilot signal, and this value is modified depending upon the channel conditions indicated by the information from the second component in the CQI determination and by the offset to the pilot power value. For example, if the number of retransmission, iterations of the Turbo decoder and/or CRC result indicate a poor channel quality, the initial SIR value is modified to reflect this poor channel quality and to reflect the offset to the pilot power value. The modified SIR is then compared to the table illustrated in FIG. 3A to determine a CQI value.

FIG. 3B illustrates a portion of a look-up table which can be stored in the radio receiver in accordance with another embodiment of the present invention.

As compared to the simple mapping of SIR values to CQI values of FIG. 3A, the look-up table of FIG. 3B includes a column for SIR values, HARQ information, Turbo decoder information and CQI values. Accordingly, the radio receiver would use the SIR value determined using the pilot signal and adjusted for the pilot power value offset, and the HARQ information and the Turbo decoder information from the HS-DSCH to locate corresponding entries in the look-up table to determine an appropriate CQI value. Some of the CQI values in the table may coincide. The particular CQI values in the table which coincide will be implementation specific, and can be determined by one skilled in the art with knowledge of the specific implementation. Although not illustrated in FIG. 3B, the table can also include a column which accounts for the CRC information for use in determining the CQI value.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, various embodiments have been described above in connection with a HSDPA system, the present invention is equally applicable to any type of packet data system in which HARQ and/or iterative decoding information are employed in determining a channel quality value which is reported to the radio communications network. Moreover, the embodiments of the present invention are equally applicable to any system in which it is desired to obtain a channel quality estimate on a per transport block basis.

Thus, the preferred embodiments are merely illustrative and should not be considered restrictive in anyway. The scope of the invention is given by the appended claims, rather than the preceding description, and all variations and equivalents which fall within the range of the claims are intended to be embraced therein.

What is claimed is:

1. A method for determining and reporting a channel quality indicator comprising:
    measuring a first quality value of a first wireless channel;
    determining a second quality value of a second wireless channel, the second quality value being determined based on an average distance between actual soft values and ideal soft values, wherein the actual soft values are generated by a turbo decoder operating to decode a code block prior to performance of an integrity check of a transport block that includes the code block and the ideal soft values are of a noiseless channel;
    determining a third quality value based on the integrity check of the transport block;
    determining a channel quality indicator based on the first and second first, second, and third quality values; and
    reporting the determined channel quality indicator.

2. The method of claim 1, wherein the transport block comprises one or more code blocks.

3. The method of claim 1, wherein the first quality value is a signal-to-interference ratio, the first wireless channel is a pilot channel, and the channel quality indicator is determined based on the signal-to-interference ratio offset by a difference between the pilot channel power and a power of the second wireless channel.

4. The method of claim 1, wherein the second quality value is further determined based on information that indicates a number of retransmissions of a transport block that includes the code block and on information that indicates a number of iterations of a decoder in decoding the code block.

5. A method for determining and reporting a channel quality indicator comprising:
    measuring a first quality value of a first wireless channel;
    determining a second quality value of a second wireless channel, the second quality value being determined based on an average distance between actual soft values and ideal soft values, wherein the actual soft values are generated by a turbo decoder operating to decode a code block and the ideal soft values are of a noiseless channel;
    determining a third quality value based on an integrity check of a transport block that includes the code block and ideal soft values of a noiseless channel;
    determining a channel quality indicator based on the first, second, and third quality values; and
    reporting the determined channel quality indicator.

6. The method of claim 5, wherein the second quality value is further determined based on information indicating at least one of:
    a number of decoder iterations employed to decode the code block; and
    a number of retransmissions of the transport block that includes the code block.

7. The method of claim 5, wherein the transport block comprises one or more code blocks.

8. The method of claim 5, wherein the first quality value is a signal-to-interference ratio, the first wireless channel is a pilot channel, and the channel quality indicator is determined based on the signal-to-interference ratio offset by a difference between the pilot channel power and a power of the second wireless channel.

9. An apparatus comprising:
    a first channel quality estimator which estimates a first quality value of a first wireless channel;
    a second channel quality estimator which estimates a second quality value of a second wireless channel, the second quality value being determined based on an average distance between actual soft values and ideal soft values, wherein the actual soft values are generated by a turbo decoder operating to decode a code block prior to performance of an integrity check of a transport block that includes the code block and the ideal soft values are of a noiseless channel;
    a third channel quality estimator which estimates a third quality value based on the integrity check of the transport block; and
    a channel quality indicator determination processor which determines a channel quality indicator based on the first, second, and third quality values.

10. The apparatus of claim 9, wherein the transport block comprises one or more code blocks.

11. The apparatus of claim 9, wherein the first quality value is a signal-to-interference ratio, the first wireless channel is a pilot channel, and the channel quality indicator is determined based on the signal-to-interference ratio offset by a difference between the pilot channel power and a power of the second wireless channel.

12. The apparatus of claim 9, wherein the second quality value estimator further comprises an automatic retransmission request processor, and an iterative decoder wherein the second quality value is further determined based on information that indicates a number of retransmissions of a transport block that includes the code block and on information that indicates a number of iterations of the iterative decoder.

13. An apparatus comprising:
    a first channel quality estimator which estimates a first quality value of a first wireless channel;
    a second channel quality estimator which estimates a second quality value of a second wireless channel based on an average distance between actual soft values and ideal soft values, wherein the actual soft values are generated by a turbo decoder operating to decode a code block and ideal soft values of a noiseless channel and the ideal soft values are of a noiseless channel;
    a third channel quality estimator which estimates a third quality value based on an integrity check of a transport block that includes the code block; and
    a channel quality indicator determination processor which determines a channel quality indicator based on the first, second and third quality values.

14. The apparatus of claim 13, wherein the transport block comprises one or more code blocks.

15. The apparatus of claim 13, wherein the first quality value is a signal-to-interference ratio, the first wireless channel is a pilot channel, and the channel quality indicator is determined based on the signal-to-interference ratio offset by a difference between the pilot channel power and a power of the second wireless channel.

16. The apparatus of claim 13, wherein the second quality value is further determined based on information indicating at least one of:
    a number of decoder iterations employed to decode the code block; and
    a number of retransmissions of the transport block that includes the code block.

17. A non-transitory computer-readable medium containing a program which executes the steps of:
    measuring a first quality value of a first wireless channel;
    determining a second quality value of a second wireless channel, the second quality value being determined based on an average distance between actual soft values and ideal soft values, wherein the actual soft values are generated by a turbo decoder operating to decode a code block prior to performance of an integrity check of a transport block that includes the code block and the ideal soft values are of a noiseless channel;

determining a third quality value based on the integrity check of the transport block;

determining a channel quality indicator based on the first, second, and third quality values; and reporting the determined channel quality indicator.

18. The computer-readable medium of claim 17, wherein the transport block comprises one or more code blocks.

19. The computer-readable medium of claim 17 wherein the first quality value is a signal-to-interference ratio, the first wireless channel is a pilot channel, and the channel quality indicator is determined based on the signal-to-interference ratio offset by a difference between the pilot channel power and a power of the second wireless channel.

20. The computer-readable medium of claim 17, wherein the information that indicates at least one of a number of retransmissions of a transport block that includes the code block and on information that indicates a number of iterations of a decoder in decoding the code block.

* * * * *

UNITED STATES PATENT AND TRADEMARK OFFICE
CERTIFICATE OF CORRECTION

PATENT NO.         : 8,018,902 B2
APPLICATION NO.    : 10/455351
DATED              : September 13, 2011
INVENTOR(S)        : Wintzell It is certified that error appears in the above-identified patent and that said Letters Patent is hereby corrected as shown below:

Title Page 2, in Field (56), under "OTHER PUBLICATIONS", in Column 2, Line 4, delete "Nework" and insert -- Network --, therefor.

In Column 7, Line 14, in Claim 1, delete "block:" and insert -- block; --, therefor.

In Column 9, Line 8, in Claim 18, delete "The" and insert -- The non-transitory --, therefor.

In Column 9, Line 10, in Claim 19, delete "The" and insert -- The non-transitory --, therefor.

In Column 10, Line 5, in Claim 20, delete "The" and insert -- The non-transitory --, therefor.

Signed and Sealed this
Seventeenth Day of July, 2012

David J. Kappos
*Director of the United States Patent and Trademark Office*